Nov. 11, 1952     J. H. CROWELL ET AL     2,617,816
CATALYTIC CONVERSION OF CARBON MONOXIDE AND HYDROGEN
TO HYDROCARBONS AND OXYGENATED ORGANIC COMPOUNDS
Filed Oct. 11, 1950
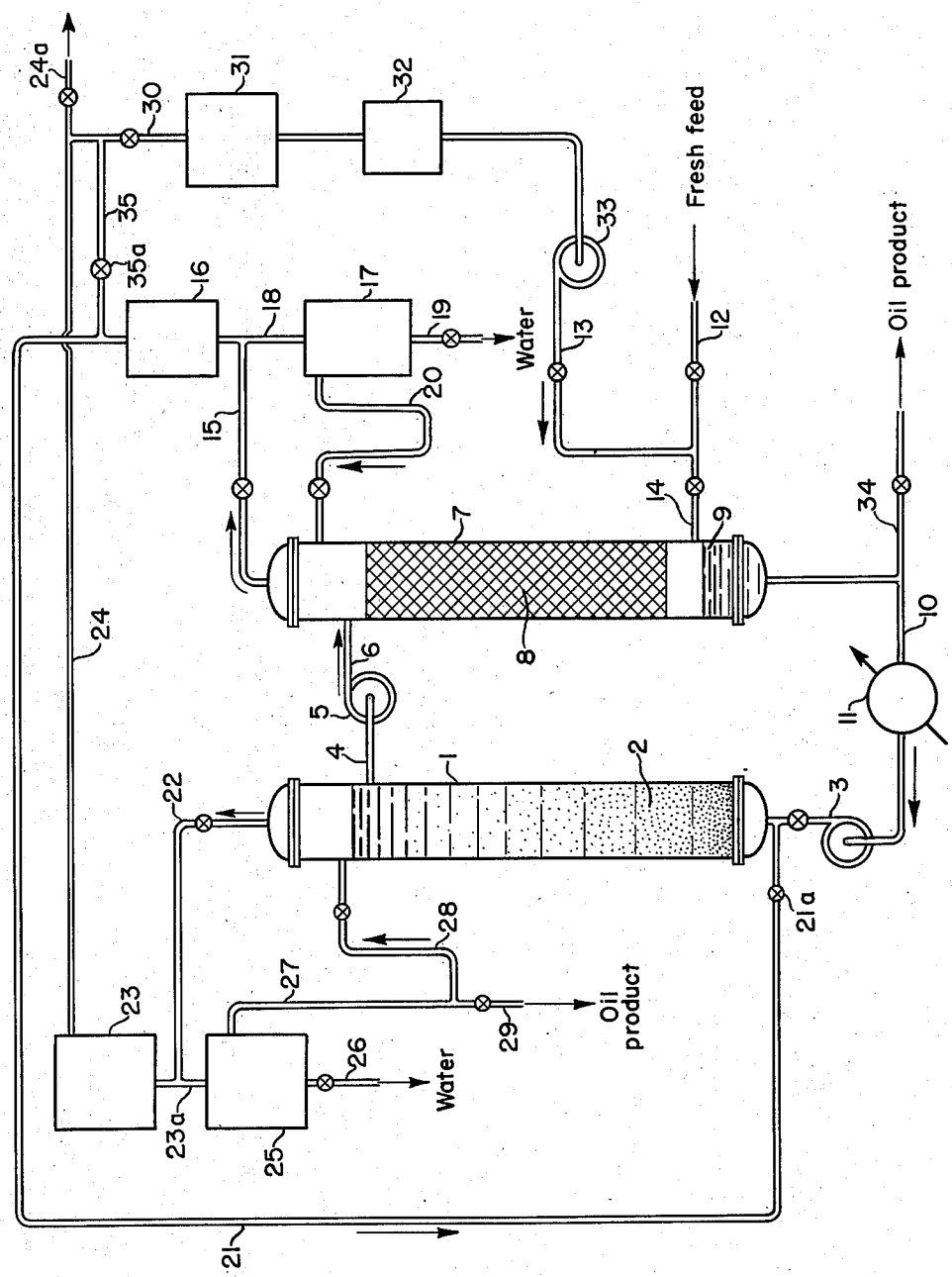
INVENTORS
Joyce H. Crowell
Homer E. Benson
BY *Donald G. Welsh*
ATTORNEY Patented Nov. 11, 1952

2,617,816

UNITED STATES PATENT OFFICE 2,617,816

CATALYTIC CONVERSION OF CARBON MONOXIDE AND HYDROGEN TO HYDROCARBONS AND OXYGENATED ORGANIC COMPOUNDS

Joyce H. Crowell and Homer E. Benson, Pittsburgh, Pa., assignors to The United States of America as represented by the Secretary of the Interior Application October 11, 1950, Serial No. 189,639

16 Claims. (Cl. 260—449.6)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to the catalytic conversion of mixtures of hydrogen and carbon monoxide to hydrocarbons and oxygenated organic compounds and is particularly concerned with improvements in the so-called submerged catalyst-type of operation, wherein the conversion catalyst is immersed directly in a cooling liquid for removing the heat of reaction from the reaction zone.

In the conduct of processes involving the production of liquid hydrocarbons and oxygenated compounds from mixtures of hydrogen and carbon monoxide, in the presence of a conversion catalyst, it is well known that large quantities of heat are liberated. In order to remove this exothermic heat of reaction from the reaction zone, a number of methods have been proposed. One well known method for accomplishing this is to immerse the catalyst directly in a cooling liquid and to remove the reaction heat by removing heat from the cooling liquid, usually by circulating it through a cooler or waste heat boiler situated outside the reaction zone. This invention is concerned with an improvement in this so-called immersed catalyst type of operation, the improvement making possible a more efficient utilization of the synthesis gas, and the prolongation of the effective life of the catalyst. Since the cost of purified synthesis gas (carbon monoxide and hydrogen) and the cost of the preparation and regeneration of the synthesis catalyst are two of the most important items contributing to the direct cost of the synthesis products, any improvements resulting in the conservation of either the synthesis gas or the catalyst will produce significant reduction in the cost of the final synthesis products.

An important factor in measuring the efficiency of utilization of the synthesis gas is the $H_2:CO$ usage ratio, which is defined as the ratio of moles of hydrogen to carbon monoxide consumed in the synthesis. The optimum usage ratio is such that hydrogen and carbon monoxide are consumed in the synthesis in the same molar ratio in which they are present in the fresh gas fed to the synthesis. When the usage ratio is at its optimum value, the $H_2:CO$ ratio in the tail gas from the synthesis will be substantially the same as that in the fresh feed, permitting unconverted $H_2$ and $CO$ in the tail gas to be reutilized directly (for example, in a second conversion stage) thus allowing substantially complete utilization of the synthesis gas. On the other hand, when the usage ratio rises above, or falls below, the optimum value, the $H_2:CO$ ratio in the tail gas becomes different from that in the fresh feed, the tail gas being poorer or richer in hydrogen depending upon whether the usage ratio rises above or falls below its optimum value respectively. In these cases it may not be practical to reutilize the synthesis gas in the tail gas directly without an expensive reforming step to correct its composition. It is known that it is possible to improve the usage ratio when, under the process conditions it inherently falls below the optimum value by using a high ratio of recycle gas to fresh feed, for example, 5:1 and higher, but the cost of recycling such large quantities of gas is prohibitive. It is also known that when the usage ratio falls below its optimum value, it may usually be increased by decreasing the percentage conversion of the fresh feed, but decreasing the conversion is undesirable, naturally, since it decreases the capacity of the conversion unit. By means of the present invention, however, in a process involving the use of a catalyst bed submerged in a cooling liquid for removing reaction heat, it is possible to increase the consumption of hydrogen in respect to the consumption of carbon monoxide under given process conditions, and thus to increase the usage ratio closer to its optimum value when it falls below the optimum, without resorting to undesirable expedients such as the use of a high ratio of recycle gas to fresh feed, or other undesirable means.

The effective life of the synthesis catalyst depends chiefly upon the temperature of operation, and the concentration, in the reaction zone, of substances which have a deleterious effect upon the activity of the catalyst. The lower the temperature of operation which will produce a satisfactory conversion of synthesis gas to products, and the smaller the concentration of substances in the reaction zone harmful to catalyst activity, the longer will be the effective life of the catalyst. In addition to improving the usage ratio, the process of the invention permits lower temperatures of operation for comparable percentage conversions of synthesis gas and at the same time reduces the concentration of substances harmful to catalyst activity.

Broadly stated, the improved process of the invention, which provides the advantages discussed above, involves the steps of withdrawing a stream of the cooling liquid, in which the conversion catalyst is immersed, from the reaction zone, and passing this stream, free from catalyst, in countercurrent contact with a relatively dry gas stream comprising a mixture of hydrogen and carbon monoxide suitable for conversion in the reaction zone, and then recycling the cooling liquid back to the reaction zone.

According to the preferred manner of conducting this process, at least a portion of the synthesis gas stream, which has been passed in countercurrent contact with the stream of cooling liquid, is first treated for the removal of water and other condensible products stripped from the cooling liquid, and is then passed to the reaction zone to provide synthesis gas feed. Most advantageously, the major portion of all the synthesis gas fed to the reaction zone, including both fresh gas and recycle gas, is first passed in countercurrent contact with the liquid coolant, treated for the removal of water and other normally liquid products stripped from the cooling liquid and then conducted to the reaction zone to provide the major portion of the synthesis gas feed. Other embodiments and advantageous methods of operation will be apparent from the description which follows.

To enable a better understanding of the invention, reference is now made to the accompanying drawing which illustrates a preferred embodiment thereof.

The reference numeral 1 refers to the reaction vessel which contains the conversion catalyst 2 suspended in a cooling oil which is preferably an equilibrium mixture comprised essentially of the higher molecular weight products of the reaction. In the embodiment illustrated, the liquid coolant is pumped upwardly through the reaction zone by pump 3 at a velocity such that the catalyst particles are suspended and agitated in the upwardly flowing stream of cooling oil, but are not, however, entrained. The settling rate of the particles is such that the oil at the top portion of the reactor is maintained substantially free of catalyst. The velocity of cooling oil flowing upwardly through the reactor which is necessary to maintain the catalyst bed in an expanded and agitated condition, but which will not cause entrainment of the catalyst particles in the oil stream, will depend chiefly upon the size and density of the catalyst particles employed, and can be conveniently determined by empirical methods for any given batch of catalyst. It is to be understood that while the invention is described in reference to a process employing this type of freely moving expanded catalyst bed, other types of catalyst beds may be employed, so long as it is possible to separate the cooling oil from the catalyst before countercurrent contact with a stream of synthesis gas in a zone separate from the reaction zone.

From the upper portion of the reactor, cooling oil which is substantially free from catalyst particles is withdrawn by line 4. By way of circulating pump 5 and line 6 the coolant is then conducted to the upper portion of tower 7 suitably packed or otherwise constructed for the countercurrent contacting of gases and liquids. The coolant trickles downwardly through the packed tower 7 while a combined stream of fresh gas from line 12 and recycle gas from line 13 is fed to the bottom portion of the tower by line 14 and passes upwardly through the column in countercurrent contact with the downwardly flowing coolant. After contact with the synthesis gas stream, the coolant collects in the bottom of the tower in a sump 9, and the major portion is recycled to the reactor 1 by way of line 10, heat exchanger 11, and circulating pump 3. In the heat exchanger 11, which may be simply a cooler or a waste heat boiler, for example, heat produced by the reaction is removed, thus maintaining the temperature level of the cooling liquid, and consequently the temperature level in the reaction zone within constant limits. In order to prevent the accumulation of heavy products in the cooling oil particularly waxes boiling above 450° C., when relatively high molecular weight products of the reaction are utilized as the coolant, a minor portion of the stream of coolant flowing from the sump 9 is continuously withdrawn from the system as an oil product by line 34. If desired, this heavy oil product may be treated to remove the heavy waxes and reintroduced to the system to change the properties of the coolant.

The effluent gases collecting at the top of the tower 7 together with water and other volatiles stripped from the coolant in the tower, leave the tower by line 15 and are conducted to a condenser 16 where the normally liquid products contained in the gas stream are condensed, and flow into vessel 17 by line 18. In vessel 17 an aqueous lower layer and an upper hydrocarbon layer separates. The lower aqueous layer, containing water-soluble oxygenated compounds such as lower acids, alcohols, aldehydes, and ketones, is withdrawn by line 19. The upper hydrocarbon layer is withdrawn by line 20 and returned to the tower 7.

Preferably all, or the major portion of the gas stream leaving the condenser 16 is conducted by line 21 to the reaction vessel where it passes upwardly in cocurrent flow with the cooling liquid in contact with the conversion catalyst, and is converted into predominantly liquid hydrocarbons with smaller amounts of oxygenated organic compounds, water, and $CO_2$. From the upper portion of the reactor, a gas stream is withdrawn by line 22 containing unreacted carbon monoxide and hydrogen and the products of the reaction including gaseous and liquid hydrocarbons, oxygenated organic compounds, carbon dioxide, and water vapor. This product stream is conducted to condenser 23 where all, or the major portion of the water, and normally liquid hydrocarbons and oxygenated organic compounds are separated from the gas stream to form a tail gas stream containing principally unconverted hydrogen and carbon monoxide and a substantial percentage of carbon dioxide. This tail gas stream is withdrawn from condenser 23 by line 24. The liquid products separated by condenser 23 flow by line 23a into the vessel 25. Here, an aqueous layer containing water soluble oxygenated compounds is withdrawn by line 26. The upper hydrocarbon layer which separates in the upper portion of vessel 25 is withdrawn therefrom by line 27. The major portion of this hydrocarbon product is returned to the reactor by line 28, while a minor portion is withdrawn by line 29 as light oil product.

A portion of the tail gas stream flowing from condenser 23 by line 24 is withdrawn for recycle by line 30. Another portion is bled out of the system by line 24a, and if desired, conducted to another synthesis stage for more complete utilization of the synthesis gas. If desired, the carbon dioxide in the recycle gas stream may be removed in scrubber 31. Similarly, if desired, gaseous olefins in the recycle gas stream may be removed by oil scrubber 32. Any other treatments or conditioning steps not illustrated or mentioned may be performed if desired, on the recycle gas stream before it is passed by means of recycle compressor 33, to line 13 to be combined with the fresh feed gas from line 12.

Operation of the converter 1 and the tower 7 in series with one another in respect to the synthesis gas stream, as described above (that is, operation in such a manner that substantially the entire stream of synthesis gas passing through the reaction zone is first passed through the tower 7), is the preferred manner of operation particularly when a hydrogen-rich fresh feed gas is employed. Many other widely varying methods of operation are included within the purview of the invention however. For example, part of the synthesis gas stream leaving condenser 16 may be diverted into line 35, and then conducted by line 30, compressor 33, and lines 13 and 14 back to the tower 7 for further countercurrent contact with the coolant. The proportion of the synthesis gas stream which flows into line 35 for continuous recycle through the tower 7, and the relative proportion which flows by way of line 21 to the converter may be controlled, for example, by proper adjustment of valves 35a and 21a, respectively.

Likewise, other methods of operation not illustrated in the drawing may be employed. For example, instead of introducing fresh feed to the tower 7 with the recycle gas, the fresh feed may be introduced directly to the reaction zone, thus reducing the volume of synthesis gas passing through the tower 7, if this should be found desirable. Conversely, if desired, only fresh gas feed may be introduced to the tower 7, recycle gas being recycled directly to the reaction zone, bypassing the tower 7. By these, and other variations possible within the broad purview of the invention, it is possible to regulate the proportion of synthesis gas which passes through the reaction zone in respect to the proportion passing through the tower 7.

Examples

In order to illustrate the operation of the process of the invention according to its preferred embodiment, and to demonstrate the advantages obtained by such operation as compared to conventional methods of operation, two separate runs were conducted. In the first run (Example 1) the process was operated substantially as shown in the drawing, the tower 7 being operated in series with the converter. Thus, in Example 1, the entire synthesis gas stream, including both recycle gas and fresh feed were first passed through the tower in countercurrent contact with the cooling oil, and the entire stream conducted to condenser 16 and then to the converter. Valve 35a on line 35 was closed, valve 21a on line 21 being open. In the second run (Example 2) for the sake of comparison, the process was conducted according to conventional procedure, tower 7 being omitted, the synthesis stream being fed directly to the converter as usual. Other than this difference, conditions in both runs were the same.

In both Examples 1 and 2, a cylindrical reaction vessel was employed having an inside diameter of 3″ and an overall height of 10 feet, the cooling oil level in the reactor being at 8 feet. In both examples, the catalyst employed was a promoted iron-type catalyst prepared by reducing a fused iron oxide synthetic ammonia-type catalyst at 450° C. for a period of from 48 to 72 hours. Before reduction the catalyst contained 93.5% $Fe_3O_4$, 4.6% MgO, and minor amounts of $Cr_2O_3$, $Mn_3O_4$, $K_2O$, and $SiO_2$, while after reduction about 95% of the $Fe_3O_4$ was reduced to metallic iron. In each case this catalyst was charged to the converter in a mesh size of 6 to 20 mesh, and the catalyst bed depth in settled condition was 4 feet.

In both examples, the cooling oil employed was an equilibrium mixture consisting predominantly of hydrocarbons produced by the reaction. The process conditions were adjusted so that the cooling oil was substantially non-volatile under the reaction conditions. Approximately 35% of the cooling oil mixture boiled above 450° C. at atmospheric pressure. This oil, in each case, was circulated through a reaction zone at 120 to 150 gallons per hour, corresponding to a superficial linear velocity between 0.1 to 0.15 feet per second. This rate of circulation caused a 20 to 40% expansion in the catalyst bed, but substantially no entrainment of the catalyst particles, and resulted in maintaining a temperature differential of from 3° to 4° C. between the bottom and top of the catalyst bed.

The system pressure in both examples was maintained at 300 lb. per square inch gage with a 3 to 4 lb. pressure drop through the converter. In both cases, a synthesis gas containing hydrogen and carbon monoxide in a 1:1 ratio was employed as fresh feed, the ratio of recycled gas to fresh feed was 1:1, and the fresh feed space velocity was 600 SVH based on the volume of the settled bed.

In Example 1, the tower employed for countercurrently contacting the cooling oil with the synthesis gas stream was a column having an inside diameter of 6 inches, a total height of 8 feet, of which 6 feet was packed with ½ inch Raschig rings.

The type of products obtained in both Examples 1 and 2 were substantially the same. Two oil products were obtained, a light oil product withdrawn by line 29 from the stream refluxing into the reactor through line 27, and a heavy oil product withdrawn from the recycle cooling oil, as at line 34. The light oil was chiefly paraffinic hydrocarbons and had an °API gravity of about 62 at 60° F. and an A. S. T. M. boiling range beginning at 44° C. with an endpoint at 228° C. The heavy oil product was likewise chiefly paraffinic hydrocarbons and had an °API gravity of about 41 at 60° F., and an A. S. T. M. boiling range beginning at 206° C., with 35% boiling over 450° C. The aqueous layers contained various oxygenated compounds, chiefly alcohols, including methyl, ethyl, n-propyl and n-butyl, with some acetic acid and acetone.

Both Examples 1 and 2 were conducted over comparable periods, the operating conditions during these periods being checked at frequent intervals. In the table below are summarized the results obtained with both methods of operation.

| | Example 1 (Tower 7 Included) | Example 2 (Tower 7 Excluded) |
|---|---|---|
| Ratio of recycle gas to fresh feed in synthesis gas stream | 1.0 | 1.0 |
| $H_2$:CO ratio in fresh feed gas | 1.0 | 1.0 |
| $H_2$:CO ratio in tail gas | 1.0 | 1.39 |
| Usage ratio ($H_2$:CO) | 1.0 | 0.87 |
| Average temperature of operation, °C. (top of bed) °C | 244 | 248 |
| Percent conversion of $H_2$+CO in fresh feed | 70.0 | 68.4 |
| Percent organic acid by weight (assuming acetic acid) in cooling oil | 0.01 | 0.03 |
| $CO_2$ as percentage of dissolved gas ($H_2$+CO+$CO_2$) percent | 25 | 51 |

It will be noted that in Example 1, conducted according to the invention, the ideal usage ratio is obtained; the ratio of $H_2$:CO in the fresh feed is the same as that in the tail gas. In Example 2, on the other hand, operated in the same manner as Example 1 except for the omission of the step of countercurrently contacting the cooling liquid with the synthesis gas stream, a usage ratio of only 0.87 is obtained. As a result, of course, a hydrogen-rich tail gas is produced, the $H_2$:CO ratio in the tail gas being 1.39, whereas the $H_2$:CO ratio in the fresh feed was 1.0. Utilizing the tail gas from the first stage of an operation according to Example 2 in a second stage of conversion, it would be still more difficult to obtain in the second stage an optimum usage ratio starting with the hydrogen-rich tail gas obtained according to Example 2. The end result is the accumulation of a gas so rich in hydrogen as to be entirely unsuitable in the synthesis. With an optimum usage ratio, on the other hand, such as that obtained in Example 1, it is possible to utilize the tail gas from the first conversion stage in as many additional consecutive stages as desired until substantially complete utilization of the synthesis gas is obtained.

In addition to improving the usage ratio, operation according to the invention permitted a lower temperature of operation for an equivalent percent conversion of synthesis gas, and at the same time reduced the amount of acids and carbon dioxide dissolved in the cooling oil, all of which effects contribute to prolonging the effective life of the catalyst. As previously explained, the lower the temperature of operation required to provide a given percent conversion, the longer will be the effective life of the catalyst. With the catalyst employed in these examples, it is ordinarily necessary to increase the operating temperature about 1° C. per week in order to maintain a 70% conversion. Thus a difference of only 4° in the average operating temperature will result in an estimated prolongation of the effective catalyst life of one month. Furthermore, the reduction of the concentration of organic acids and carbon dioxide dissolved in the cooling oil resulting from operation according to the invention, further increases the effective life of the catalyst since these substances have deleterious oxidative and corrosive effects upon most Fischer-Tropsch catalysts.

Since the effect of operation according to the invention is to increase the consumption of hydrogen in respect to the consumption of carbon monoxide under a given set of process conditions, the result is an increase in the hydrogen to carbon monoxide usage ratio. Consequently, the invention will be most useful in connection with operations using a feed gas relatively rich in hydrogen, since with the use of this type of gas the usage ratio inherently falls below the optimum value. From experience with the submerged catalyst type of operation, it has been found that when the hydrogen to carbon monoxide ratio in the feed gas is greater than 0.9, it is difficult to bring the usage ratio up to its optimum value without increasing the recycle ratio (that is, the ratio of tail gas to fresh feed in the synthesis stream). For example, using a 1:1 hydrogen to carbon monoxide feed gas, and operating according to conventional procedure, as in Example 2, it is necessary to use a 2:1 recycle ratio in order to bring the usage ratio to its optimum value. With a fresh feed containing 1.3 $H_2$:1CO the optimum usage ratio could not be obtained even at a gas recycle ratio of 6:1, operating according to conventional procedures. With the use of a carbon monoxide-rich gas (for example 0.7$H_2$:1CO) it is generally not as difficult to obtain the optimum usage ratio. However, even with a carbon monoxide-rich gas, the operation according to the invention may be employed to permit the attainment of an optimum usage ratio in conjunction with extremely low recycle ratios.

While the invention does not depend on any particular theory, it is believed that some of the advantages produced by this method of operation result from the removal of water from the coolant by countercurrent contact with the relatively dry synthesis gas stream, coupled with the simultaneous saturation of the coolant with carbon monoxide and hydrogen. Both of these effects would tend to decrease the partial pressure of water vapor in the reaction zone. It is probable that a low $H_2$:CO usage ratio results from reaction of carbon monoxide with water according to the water gas shift reaction:

$$CO + H_2O \rightleftharpoons CO_2 + H_2$$

with the reaction proceeding predominantly toward the right. A reduction in the partial pressure of water vapor in the reaction zone, consequently, would tend to suppress the water gas shift equilibrium in the right hand direction and by increasing the consumption of hydrogen in respect to carbon monoxide would increase the usage ratio to a value closer its optimum. It is also believed that the reduction in the concentration of $CO_2$ in the cooling oil which probably results from the countercurrent contact of the synthesis gas with the coolant is at least partly responsible for the lower temperatures of operation possible in accordance with the invention.

In operation of the process of the invention, any type of catalyst bed may be utilized so long as it is possible to separate the cooling liquid from the catalyst before the coolant is passed in countercurrent contact with the synthesis gas stream. Thus, in addition to the expanded or moving bed illustrated in the drawing, it is also possible, for example, to use a fixed catalyst bed, or even the so-called slurry operation wherein the catalyst, in very finely divided form, is formed into a slurry with the cooling liquid, and is circulated through the system in the slurry form. In the case of the slurry operation, however, it would be necessary to filter out the fine catalyst particles from the cooling liquid before passing it in countercurrent contact with the synthesis gas stream.

The synthesis gas which is employed to countercurrently contact the stream of cooling liquid withdrawn from the reaction zone must be relatively dry with respect the cooling liquid. That is, the concentration of water vapor in the synthesis gas stream in countercurrent contact with the coolant must be less than that which would be found in a gas in equilibrium with the wet cooling liquid, and preferably the water vapor concentration in this gas stream should be less than 1% by volume.

The cooling liquid employed, of course, should, among other things, have a suitable boiling range and be compatible with the catalyst used. Although any suitable cooling oil may be employed in the process of the invention, it is preferred to employ one consisting primarily of hydrocarbons of suitable boiling range. Most desirably a cooling oil comprised essentially of the higher molecular weight products of the reaction itself, that is, primarily of products boiling above about 50° C. or higher may be employed.

The tower for countercurrently contacting relatively dry synthesis gas with coolant may be a tower or a vessel of any type suitable for the countercurrent contacting of a gas and a liquid. Thus, it may be a packed tower of the trickling type with a suitable packing such as Raschig rings or berl saddles, or it may be of the type equipped with plates and bubble caps.

The process may be operated under the usual synthesis conditions heretofore employed in the submerged catalyst operation. Thus, iron, cobalt, or nickel catalysts may be employed in the usual physical forms, for example, precipitated, supported, fused or sintered catalysts. The invention will give particularly important improvements in connection with the use of iron type catalysts. The type of iron catalysts prepared by fusing or heavily sintering an iron oxide followed by reduction of the oxide, are particularly desirable. The temperature of operation may be from 150° to 350° C. and preferably from 180° to 320° C. The reaction pressure may range from atmospheric pressure to over 1000 lbs. per square inch. The fresh synthesis gas feed may contain hydrogen and carbon monoxide ratios ranging from $1H_2:3CO$ to $3H_2:1CO$, and preferably ranging from $1H_2:2CO$ to $2H_2:1CO$. As previously explained, the invention is particularly advantageous when a hydrogen-rich feed gas is employed. Any desired recycle ratio (ratio of tail gas to fresh feed) may be employed from 0 to 10:1 and higher, if desired.

It is to be understood that the above description, together with the specific examples and embodiments described, is intended merely to illustrate the invention, and that the invention is not to be limited thereto, nor in any way except by the scope of the appended claims.

We claim:

1. In a process for the catalytic conversion of mixtures of hydrogen and carbon monoxide to hydrocarbons and oxygenated organic compounds wherein the conversion catalyst is immersed directly in a cooling liquid for removing the heat of reaction from the reaction zone, the steps of withdrawing a stream of said cooling liquid from said reaction zone, passing said withdrawn cooling liquid, free from said catalyst, to a contacting zone, and therein passing said cooling liquid countercurrently in contact with a relatively dry gas stream comprising a mixture of hydrogen and carbon monoxide, withdrawing said cooling liquid from one end of said contacting zone for recycle to said reaction zone, and withdrawing said gas stream, after countercurrent contact with said cooling liquid, from the opposite end of said contacting zone.

2. In a process for the catalytic conversion of mixtures of hydrogen and carbon monoxide to hydrocarbons and oxygenated organic compounds wherein the conversion catalyst is immersed directly in a cooling liquid for removing the heat of reaction from the reaction zone, the steps of withdrawing a stream of said cooling liquid from said reaction zone, passing said withdrawn cooling liquid, free from said catalyst, to a contacting zone, and therein passing said cooling liquid countercurrently in contact with a relatively dry gas stream comprising a mixture of hydrogen and carbon monoxide, withdrawing said cooling liquid from the one end of said contacting zone, extracting heat from said cooling liquid, recycling said cooling liquid to said reaction zone, and withdrawing said gas stream, after countercurrent contact with said cooling liquid from the opposite end of said contacting zone.

3. In a process for the catalytic conversion of mixtures of hydrogen and carbon monoxide to hydrocarbons and oxygenated organic compounds wherein the conversion catalyst is an iron type catalyst and is immersed directly in a cooling liquid for removing the heat of reaction from the reaction zone, the steps of withdrawing a stream of said cooling liquid from said reaction zone, passing said withdrawn cooling liquid, free from said catalyst, to a contacting zone, and therein passing said cooling liquid, countercurrently in contact with a relatively dry gas stream comprising a mixture of hydrogen and carbon monoxide, withdrawing said cooling liquid from one end of said contacting zone, extracting heat from said cooling liquid, recycling said cooling liquid to said reaction zone, and withdrawing said gas stream, after countercurrent contact with said cooling liquid, from the opposite end of said contacting zone.

4. In a process for the catalytic conversion of mixtures of hydrogen and carbon monoxide to hydrocarbons and oxygenated organic compounds wherein the conversion catalyst is immersed directly in a cooling oil comprised essentially of the higher molecular weight products of the reaction for removing the heat of reaction from the reaction zone, the steps of withdrawing a stream of said cooling oil from said reaction zone, passing said withdrawn cooling oil, free from said catalyst, to a contacting zone and therein passing said cooling liquid countercurrently in contact with a relatively dry gas stream comprising a mixture of hydrogen and carbon monoxide, withdrawing said cooling liquid from one end of said contacting zone, extracting heat from said cooling oil, recycling said cooling oil to said reaction zone, and withdrawing said gas stream, after countercurrent contact with said cooling oil, from the opposite end of said contacting zone.

5. The process according to claim 4 wherein the conversion catalyst is an iron type catalyst.

6. In a process for the catalytic conversion of mixtures of hydrogen and carbon monoxide to hydrocarbons and oxygenated organic compounds, wherein said hydrogen-carbon monoxide mixtures are passed through a reaction zone in contact with a catalyst for the conversion and wherein the conversion catalyst is immersed directly in a cooling liquid for removing the heat of reaction from the reaction zone, the steps of withdrawing a stream of said cooling liquid from said reaction zone, passing said withdrawn cooling liquid, free from said catalyst, to a contacting zone, and therein passing said cooling liquid countercurrently in contact with a relatively dry gas stream comprising a mixture of hydrogen and carbon monoxide suitable for conversion in said reaction zone, withdrawing said cooling liquid from one end of said contacting zone, extracting heat from said cooling liquid, recycling said cooling liquid to said reaction zone, withdrawing said gas stream, after countercurrent contact with said cooling liquid, from the opposite end of said contacting zone, treating said gas stream to remove water therefrom, and passing at least a portion of the treated gas stream to said reaction zone.

7. The process according to claim 6 wherein the conversion catalyst is an iron type catalyst.

8. In a process for the catalytic conversion of mixtures of hydrogen and carbon monoxide to hydrocarbons and oxygenated organic compounds, wherein said hydrogen-carbon monoxide mixtures are passed through a reaction zone in contact with a catalyst for the conversion and wherein the conversion catalyst is immersed directly in a cooling oil comprised essentially of the higher molecular weight products of the reaction for removing the heat of reaction from the reaction zone, the steps of withdrawing a stream of said cooling oil from said reaction zone, passing said withdrawn cooling oil, free from said catalyst, to a contacting zone, and therein passing said cooling oil countercurrently in contact with a relatively dry gas stream comprising a mixture of hydrogen and carbon monoxide suitable for conversion in said reaction zone, withdrawing said cooling oil from one end of said contacting zone extracting heat from said cooling oil, recycling said cooling oil to said reaction zone, withdrawing said gas stream, after countercurrent contact with said cooling oil, from the opposite end of said contacting zone, treating said gas stream to remove water therefrom, passing at least a portion of the treated gas stream to said reaction zone for partial conversion to hydrocarbons and oxygenated organic compounds, and recycling a portion of the unconverted hydrogen and carbon monoxide to said reaction zone.

9. The process according to claim 8 wherein the conversion catalyst is an iron type catalyst.

10. In a process for the catalytic conversion of mixtures of hydrogen and carbon monoxide to hydrocarbons and oxygenated organic compounds, wherein said hydrogen-carbon monoxide mixtures are passed through a reaction zone in contact with a catalyst for the conversion and wherein the conversion catalyst is immersed directly in a cooling liquid for removing the heat of reaction from the reaction zone, the steps of withdrawing a stream of said cooling liquid from said reaction zone, passing said withdrawn cooling liquid, free from said catalyst, to a contacting zone, and therein passing said cooling liquid countercurrently in contact with a relatively dry gas stream comprising a mixture of hydrogen and carbon monoxide suitable for conversion in said reaction zone, withdrawing said cooling liquid from one end of said contacting zone, extracting heat from said cooling liquid, recycling said cooling liquid to said reaction zone, withdrawing said gas stream, after countercurrent contact with said cooling liquid, from the opposite end of said contacting zone, treating said gas stream to remove water therefrom, passing at least a portion of the treated gas stream to said reaction zone for partial conversion to hydrocarbons and oxygenated organic compounds, and recycling a portion of the unconverted hydrogen and carbon monoxide to said reaction zone.

11. In a process for the catalytic conversion of mixtures of hydrogen and carbon monoxide to hydrocarbons and oxygenated organic compounds, wherein said hydrogen-carbon monoxide mixtures are passed through a reaction zone in contact with a catalyst for the conversion and wherein said conversion catalyst is immersed directly in a cooling liquid for removing the heat of reaction from the reaction zone, the steps of withdrawing a gas stream from said reaction zone containing unreacted carbon monoxide and hydrogen and products of reaction including water, hydrocarbons, and oxygenated organic compounds, separating the major portion of said water, hydrocarbons, and oxygenated organic compounds from said gas stream to form a tail gas stream, withdrawing a portion of said tail gas stream for recycle to said reaction zone, combining a fresh mixture of hydrogen and carbon monoxide with the recycle gas stream, withdrawing a stream of said cooling liquid from said reaction zone, passing said withdrawn cooling liquid, free from said catalyst, to a contacting zone, and therein passing said cooling liquid countercurrently in contact with the combined stream of recycle and fresh gas, withdrawing said cooling liquid from one end of said contacting zone, extracting heat from said cooling liquid, recycling said cooling liquid to said reaction zone, withdrawing said gas stream, after countercurrent contact with said cooling liquid, from the opposite end of said contacting zone, treating said combined gas stream to remove water therefrom, and passing at least a portion of the treated gas stream to said reaction zone.

12. The process according to claim 11 wherein the conversion catalyst is an iron type catalyst.

13. In a process for the catalytic conversion of mixtures of hydrogen and carbon monoxide to hydrocarbons and oxygenated organic compounds, wherein said hydrogen-carbon monoxide mixtures are passed through a reaction zone in contact with a particulate catalyst for the conversion and wherein the catalyst particles are immersed directly in a cooling liquid for removing the heat of reaction from the reaction zone, the steps of withdrawing a gas stream from said reaction zone containing unreacted carbon monoxide and hydrogen and products of reaction including water, hydrocarbons, and oxygenated organic compounds, separating the major portion of said water, hydrocarbons and oxygenated organic compounds from said gas stream to form a tail gas stream, withdrawing a portion of said tail gas stream for recycle to said reaction zone, combining a fresh mixture of hydrogen and carbon monoxide with the recycle gas stream, circulating said cooling liquid upwardly through said reaction zone at a velocity adjusted so that said catalyst particles are suspended and agitated, but not entrained, in said cooling liquid, withdrawing a stream of said cooling liquid, free from said catalyst particles, from the upper portion of said reaction zone, passing said catalyst-free cooling liquid to a contacting zone, and therein passing said cooling liquid countercurrently in contact with the combined stream of recycle and fresh gas, withdrawing said cooling liquid from one end of said contacting zone, extracting heat from said cooling liquid, recycling said cooling liquid to said reaction zone, withdrawing said combined gas stream after countercurrent contact with said cooling liquid, from the opposite end of said contacting zone, treating said combined gas stream to remove water therefrom, and passing at least a portion of the treated gas stream to said reaction zone in cocurrent flow with said cooling liquid.

14. In a process for the catalytic conversion of mixtures of hydrogen and carbon monoxide to hydrocarbons and oxygenated organic compounds, wherein said hydrogen-carbon monoxide mixtures are passed through a reaction zone in contact with an iron-type catalyst for the conversion and wherein said conversion catalyst is immersed directly in a cooling oil comprised essentially of the higher molecular weight products of the reaction for removing the heat of reaction from the reaction zone, the steps of withdrawing a gas stream from said reaction zone containing unreacted carbon monoxide and hydrogen and products of reaction including water, hydrocarbons, and oxygenated organic compounds, separating the major portion of said water, hydrocarbons, and oxygenated organic compounds from said gas stream to form a tail gas stream, refluxing a portion of said hydrocarbons to said reaction zone, and removing a portion thereof as light oil product, withdrawing a portion of said tail gas stream for recycle to said reaction zone, combining a fresh mixture of hydrogen and carbon monoxide with the recycle gas stream, withdrawing a stream of said cooling oil from said reaction zone, passing said withdrawn cooling oil, free from said catalyst, countercurrently in contact with the combined recycle and fresh gas stream, extracting heat from said cooling oil, recycling the major portion of said cooling oil to said reaction zone while removing a minor portion thereof as heavy oil product, treating said combined gas stream after contact thereof with said cooling oil to remove water and other readily condensible products therefrom, and passing at least a portion of the treated gas stream to said reaction zone.

15. In a process for the catalytic conversion of mixtures of hydrogen and carbon monoxide to hydrocarbons and oxygenated organic compounds wherein said hydrogen-carbon monoxide mixtures are passed through a reaction zone in contact with a catalyst for the conversion and wherein said conversion catalyst is immersed directly in a cooling liquid for removing the heat of reaction from the reaction zone, the steps of withdrawing a gas stream from said reaction zone containing unreacted carbon monoxide and hydrogen and products of reaction including water, carbon dioxide, hydrocarbons and oxygenated organic compounds, separating the major portion of said water, hydrocarbons and oxygenated organic compounds from said gas stream to form a tail gas stream, withdrawing a portion of said tail gas stream for recycle to said reaction zone, removing the major portion of the carbon dioxide from the recycle gas stream, combining a fresh mixture of hydrogen and carbon monoxide with said recycle gas stream, withdrawing a stream of said cooling liquid from said reaction zone, passing said withdrawn cooling liquid, free from said catalyst, to a contacting zone, and therein passing said cooling liquid countercurrently in contact with the combined stream of recycle and fresh gas, withdrawing said cooling liquid from one end of said contacting zone, extracting heat from said cooling liquid, recycling said cooling liquid to said reaction zone, withdrawing said combined gas stream, after countercurrent contact with said cooling liquid, from the opposite end of said contacting zone, treating said combined gas stream to remove water therefrom, and passing at least a portion of the treated gas stream to said reaction zone.

16. The process according to claim 15 wherein the conversion catalyst is an iron type catalyst.

JOYCE H. CROWELL.
HOMER E. BENSON.

REFERENCES CITED

The following references are of record in the file of this patent:

UNITED STATES PATENTS

| Number | Name | Date |
| --- | --- | --- |
| 2,433,072 | Stewart et al. | Dec. 23, 1947 |
| 2,438,029 | Atwell | Mar. 16, 1948 |
| 2,535,343 | Atwell | Dec. 26, 1950 |